United States Patent
Kumar et al.

(10) Patent No.: US 10,599,579 B2
(45) Date of Patent: Mar. 24, 2020

(54) DYNAMIC CACHE PARTITIONING IN A PERSISTENT MEMORY MODULE

(71) Applicant: Intel Corporation, Santa Clara, CA (US)

(72) Inventors: Karthik Kumar, Chandler, AZ (US); Francesc Guim Bernat, Barcelona (ES); Benjamin Graniello, Chandler, AZ (US); Thomas Willhalm, Sandhausen (DE); Mustafa Hajeer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/017,872

(22) Filed: Jun. 25, 2018

(65) Prior Publication Data
US 2019/0042458 A1 Feb. 7, 2019

(51) Int. Cl.
*G06F 12/00* (2006.01)
*G06F 12/0895* (2016.01)
*G06F 12/0846* (2016.01)
*G06F 12/0862* (2016.01)

(52) U.S. Cl.
CPC ...... *G06F 12/0895* (2013.01); *G06F 12/0848* (2013.01); *G06F 12/0862* (2013.01); *G06F 2212/1008* (2013.01); *G06F 2212/282* (2013.01); *G06F 2212/305* (2013.01); *G06F 2212/3042* (2013.01)

(58) Field of Classification Search
CPC ............. G06F 12/0848; G06F 12/0895; G06F 12/0862; G06F 2212/1008; G06F 2212/3042; G06F 2212/305; G06F 2212/282
See application file for complete search history.

(56) References Cited

U.S. PATENT DOCUMENTS

| | | | |
|---|---|---|---|
| 2011/0202708 A1* | 8/2011 | Ash ...................... | G06F 12/0866 711/103 |
| 2012/0144109 A1* | 6/2012 | Balakrishnan ...... | G06F 12/0871 711/113 |
| 2017/0031822 A1* | 2/2017 | Ma ...................... | G06F 12/0811 |

* cited by examiner

*Primary Examiner* — Shawn X Gu
(74) *Attorney, Agent, or Firm* — Compass IP Law, PC

(57) ABSTRACT

Cache on a persistent memory module is dynamically allocated as a prefetch cache or a write back cache to prioritize read and write operations to a persistent memory on the persistent memory module based on monitoring read/write accesses and/or user-selected allocation.

15 Claims, 5 Drawing Sheets

DYNAMIC CACHE PARTITIONING IN A PERSISTENT MEMORY MODULE

FIELD

This disclosure relates to memory modules and in particular to memory modules with persistent memory.

BACKGROUND

A memory module is a printed circuit board on which memory integrated circuits are mounted. A dual-in-line memory module (DIMM) is a packaging arrangement of memory devices on a socketable substrate. The memory devices on the DIMM may include volatile memory and/or non-volatile memory devices. A non-volatile memory (NVM) device is a memory whose state is determinate even if power is interrupted to the device. A volatile memory device is memory whose state (and therefore the data stored in it) is indeterminate if power is interrupted to the device. Dynamic volatile memory requires refreshing the data stored in the device to maintain state. A DIMM that includes both volatile memory and non-volatile memory may be referred to as a Hybrid DIMM.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
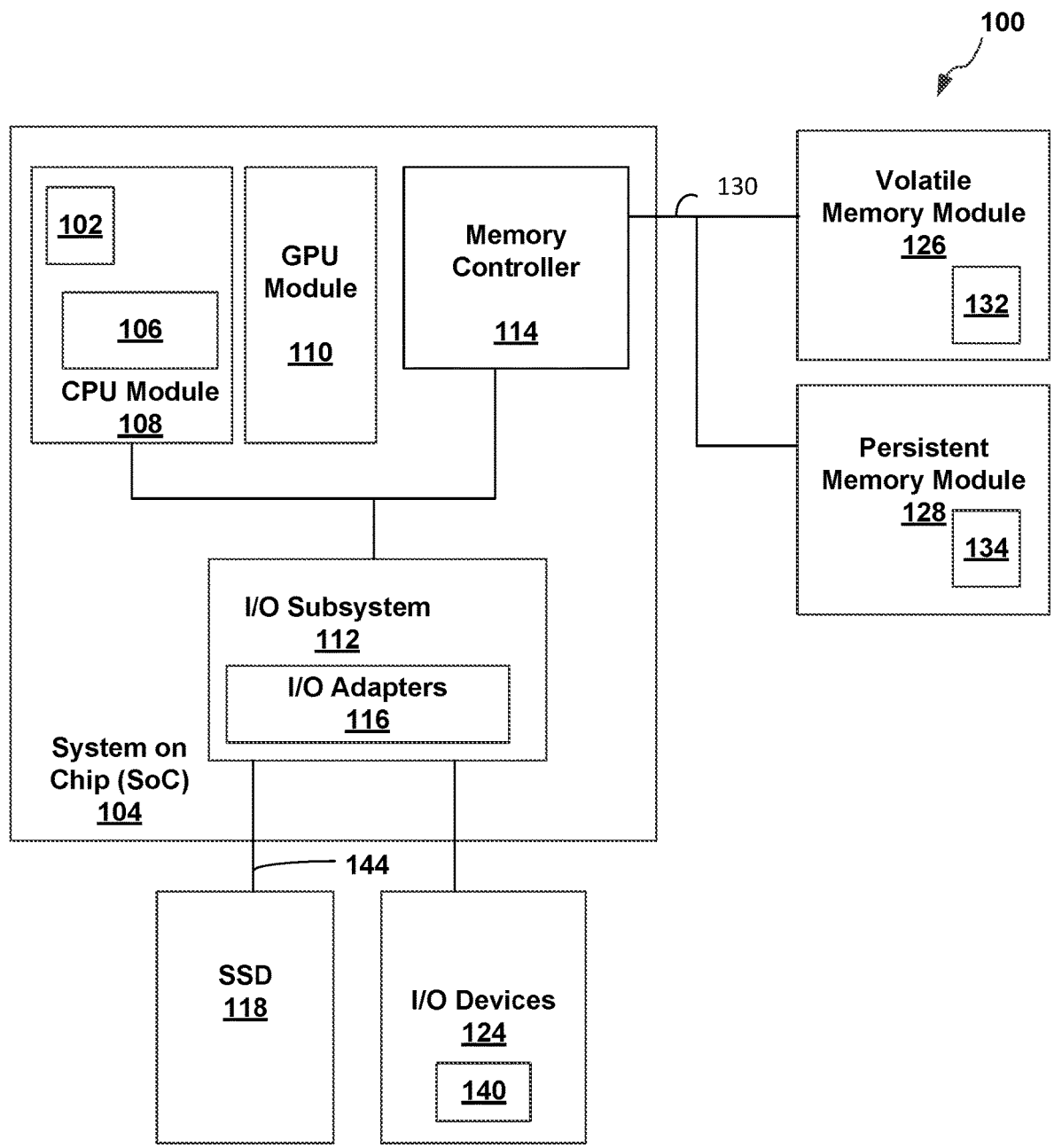
FIG. 1 is a block diagram of an embodiment a computer system that includes a persistent memory module that includes a persistent memory and a cache that is dynamically partitioned to assign a first portion of the cache to a write data buffer and a second portion of the cache to a read prefetch buffer to prioritize read and write operations to the persistent memory.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

A persistent memory is a write-in-place byte addressable non-volatile memory. The persistent memory may be directly addressable by a processor via a memory bus and may be on memory module, for example, a DIMM (dual-in-line memory module). A move instruction may be executed by the processor to move 64 bytes of data to/from the persistent memory on the memory module. As a write/read access to/from persistent memory is typically slower than write/read access to/from volatile memory, the memory module may also include a volatile memory to act as a cache for the persistent memory. A single data transfer between cache and persistent memory on the memory module may be greater than 64 bytes, for example, 256 bytes.

In response to a read request issued by a processor to read 64 bytes of data from the persistent memory on the memory module, 256 bytes may be read from the persistent memory on the memory module. The requested 64 bytes are returned to the processor in response to the read request and the other 192 bytes are stored in a read data buffer which may also be referred to as a prefetch cache in the volatile memory in the memory module. If the processor issues subsequent read requests for the other 192 bytes, these can be read directly from the prefetch cache on the memory module.

In response to a write request issued by a processor to write 64 bytes of data to the persistent memory on the memory module, instead of writing the data directly to the persistent memory on the memory module, the data is written to a write data buffer which may also be referred to as a write back cache in the volatile memory on the memory module. The write data buffer may be used to stage each 64-bytes of data to be written to persistent memory issued by the processor to combine 64-byte writes from the processor into a single 256-byte cache line to write to persistent memory.

The persistent memory on the memory module may store data for an in-memory database (IMDB) system. A database is an organized collection of data. A relational database is a collection of tables, queries, and other elements. A database-management system (DBMS) is a computer software application that interacts with other computer software applications and the database to capture and analyze data.

With some database workloads, there may be intervals of time when the write data buffer is not used, for example, if write requests to persistent memory are batched every N minutes or there are too many processor threads performing sequential writes and a window of observation, N, is not large enough to identify portions of cache lines that can be combined prior to writing an entire cache line to the persistent memory. In addition, many database workload phases have random accesses to persistent memory and there is little benefit from the read prefetch cache.

When the write data buffer is not used, the volatile memory on the memory module could be used by the read data buffer to increase the amount of data that is prefetched from persistent memory, for example, 4 Kilo Bytes (KB) instead of 256 Bytes. When the prefetch cache hit rate is low, the volatile memory assigned to the read data buffer could be used by the write data buffer to provide additional memory for observing opportunities to combine 64 byte writes into 256 cache line writes to the persistent memory. However, the allocation of volatile memory to write back cache and to read prefetch cache in the persistent memory on the memory module is static.

In an embodiment, cache on the memory module is dynamically partitioned to provide a prefetch cache and a write back cache to prioritize read and write operations to the persistent memory on the memory module based on monitoring read/write accesses and/or user-selected allocation.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of an embodiment a computer system 100 that includes a persistent memory module 128 that includes a persistent memory 134 and a cache that is dynamically partitioned to assign a first portion of the cache to a write data buffer and a second portion of the cache to a read prefetch buffer to prioritize read and write operations to the persistent memory.

Computer system 100 may correspond to a computing device including, but not limited to, a server, a workstation computer, a desktop computer, a laptop computer, and/or a tablet computer.

The computer system 100 includes a system on chip (SOC or SoC) 104 which combines processor, graphics, memory, and Input/Output (I/O) control logic into one SoC package. The SoC 104 includes at least one Central Processing Unit (CPU) module 108, a memory controller 114, and a Graphics Processor Unit (GPU) module 110. In other embodiments, the memory controller 114 may be external to the SoC 104. The CPU module 108 includes at least one processor core 102 and a level 2 (L2) cache 106.

Although not shown, the processor core 102 may internally include one or more instruction/data caches (L1 cache), execution units, prefetch buffers, instruction queues, branch address calculation units, instruction decoders, floating point units, retirement units, etc. The CPU module 108 may correspond to a single core or a multi-core general purpose processor, such as those provided by Intel® Corporation, according to one embodiment.

The memory controller 114 may be coupled to a persistent memory module 128 and a volatile memory module 126 via a memory bus 130. The persistent memory module 128 may include one or more persistent memory device(s) 134. The volatile memory module 126 may include one or more volatile memory device(s) 132.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The I/O adapters 116 may include a Peripheral Component Interconnect Express (PCIe) adapter that is communicatively coupled using the NVMe (NVM Express) over PCIe (Peripheral Component Interconnect Express) protocol over bus 144 to a host interface in the SSD 118. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus. The NVM Express standards are available at www.nvmexpress.org. The PCIe standards are available at www.pcisig.com.

The Graphics Processor Unit (GPU) module 110 may include one or more GPU cores and a GPU cache which may store graphics related data for the GPU core. The GPU core may internally include one or more execution units and one or more instruction and data caches. Additionally, the Graphics Processor Unit (GPU) module 110 may contain other graphics logic units that are not shown in FIG. 1, such as one or more vertex processing units, rasterization units, media processing units, and codecs.

Within the I/O subsystem 112, one or more I/O adapter(s) 116 are present to translate a host communication protocol utilized within the processor core(s) 102 to a protocol compatible with particular I/O devices. Some of the protocols that adapters may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 116 may communicate with external I/O devices 124 which may include, for example, user interface device(s) including a display and/or a touch-screen display 140, printer, keypad, keyboard, communication logic, wired and/or wireless, storage device(s) including hard disk drives ("HDD"), solid-state drives ("SSD") 118, removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

Figure 2:
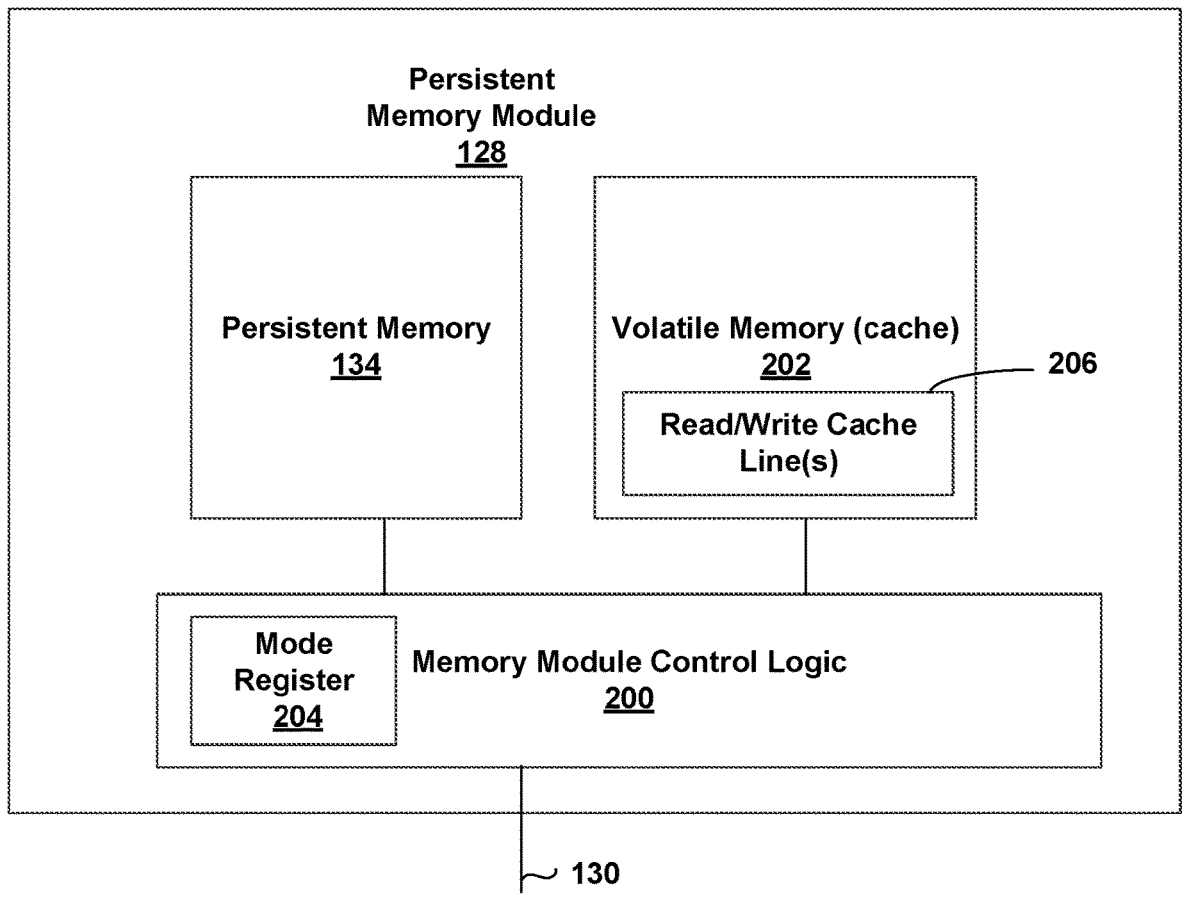
FIG. 2 is a block diagram of an embodiment of the persistent memory module shown in FIG. 1.

FIG. 2 is a block diagram of an embodiment of the persistent memory module 128 shown in FIG. 1. In an embodiment, the persistent memory module 128 is mechanically and electrically compatible with JEDEC DDR4 (DDR version 4, initial specification published in September 2012 by JEDEC). DDR4 memory modules transfer data on a data bus that is 8 bytes (64 data bits) wide.

The persistent memory module 128 includes a byte-addressable write-in-place non-volatile memory and may be referred to as a persistent memory 134. In the embodiment shown in FIG. 1, the persistent memory module 128 is directly addressable by the processor via the memory bus 130. Data stored in the persistent memory 134 in the persistent memory module 128 is available after a power cycle.

The persistent memory module 128 also includes a volatile memory 202 which acts as a cache for the persistent memory 134 which may be referred to as cache memory. Data is transferred between persistent memory 134 and volatile memory 202 (which may be referred to as an intra-module transfer) in blocks of fixed size, called cache lines or cache blocks. Each cache line 206 in the volatile memory 202 may be dynamically assigned to be a read (prefetch) cache line or a write cache line.

Each cache line in the volatile memory 202 stores N-bytes of data which is the same as the number of bytes of data transferred over memory bus 130 for a single transfer (for example, read/write access) between the memory controller 114 and the persistent memory module 128. The memory module control logic 200 fetches data from persistent memory 134 and writes the data to the cache memory 202. M times N-byte of data are transferred between persistent memory 134 and cache memory 202 for a single transfer (for example, each read/write access) on the persistent memory module 128. For example, M may be 2 or 4. In an embodiment in which N is 64-bytes and M is 4,256-bytes are transferred for each transfer between persistent memory 134 and cache memory 202. In other embodiments, more than 256 bytes may be transferred per single transfer between persistent memory 134 and cache memory 202, for example, 512 bytes or 4 Kilobytes (KB). When writing a cache line from cache memory 202 to persistent memory 134, the control logic merges 64-byte cache lines in the cache memory 202 to perform a single write access to write 256 bytes to the persistent memory 134.

In an embodiment, a cache line in volatile memory 202 on the persistent memory module 128 may be dynamically assigned as either a read cache (prefetch cache/read data buffer) line or a write cache (write back cache/write data buffer) line to prioritize read and write operations to the persistent memory 134 on the persistent memory module 128 based on monitoring read/write accesses and/or user-selected allocation. For user-selected allocation, a user may specify a preference regarding how the cache is partitioned, for example, allocate 80% of the cache entries for reads and 20% of the cache entries for writes or allocate no more than 30% of the entries to be used for writes when there are writes. For monitoring accesses allocation, the number of DIMM cycles for read accesses and write accesses are monitored. When the number of DIMM cycles used for read accesses drops below a set number, read accesses are prioritized by increasing the number of cache entries allocated for read accesses.

In response to a read request issued by the CPU module 108 to read 64 bytes of data from the persistent memory 134 on the persistent memory module 128, 256 bytes are read from the persistent memory 134 on the persistent memory module 128 and written to volatile memory (cache) 202 on the persistent memory module 128. The requested 64 bytes are returned to the CPU module 108 in response to the read request. Cache lines are dynamically assigned as read cache lines in volatile memory (cache) 202 in the persistent memory module 128 to store the other 192 bytes of the 256-byte cache line. If the CPU module 108 issues subsequent 64-byte read requests for the other 192 bytes, these can be read directly from the volatile memory (cache) 202 on the persistent memory module 128.

In response to a write request issued by the core 102 in the CPU module 108 to write 64 bytes of data to the persistent memory 134 on the persistent memory module 128, instead of writing the 64-byte data directly to the persistent memory 134 on the persistent memory module 128, the data is first written to a 64-byte cache line dynamically assigned as a write cache line in volatile memory 202 on the persistent memory module 128. The 64-byte write cache lines assigned in volatile memory 202 for a 256-byte write to persistent memory 134 may be used to stage each 64-bytes of data to be written to persistent memory 134 issued by the core 102 in the CPU module 108 to combine 64-bytewrites from the core 102 in the CPU module 108 into a single 256-bit cache line to write to persistent memory 134 on the persistent memory module 128.

The memory module control logic 200 includes at least one mode register 204 used to manage the dynamic partitioning of read and write cache lines 206 in volatile memory 202. The mode register 204 stores a configurable minimum and maximum cache hit rate (MIN_THRESHOLD/MAX_THRESHOLD) for the cache lines 206 in the volatile memory 202 that are assigned to read cache. The mode register 204 also stores a configurable minimum age threshold (MIN_AGE_THRESHOLD) for the cache lines 206 in the volatile memory 202 that are assigned to write cache.

Figure 3A:
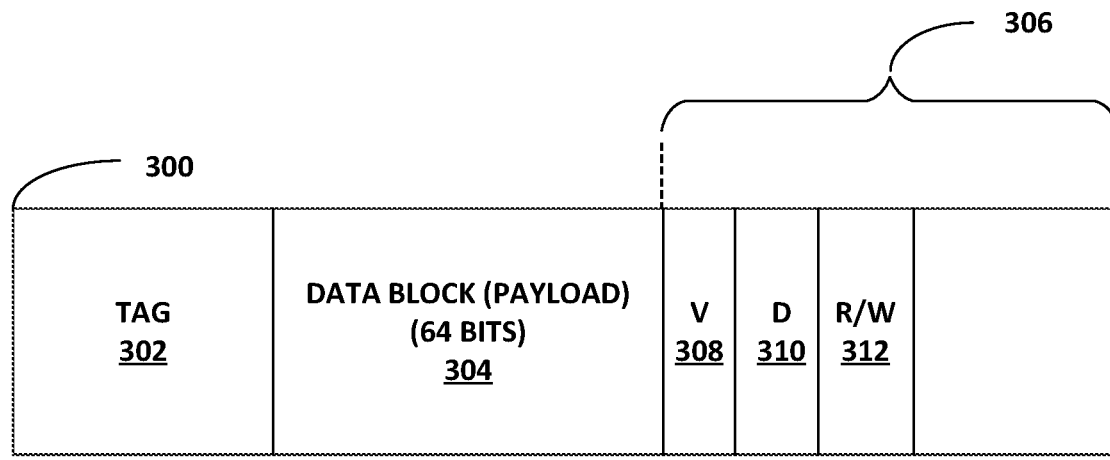
FIG. 3A is a block diagram illustrating a read cache entry in volatile memory on the persistent memory module shown in FIG. 2.

FIG. 3A is a block diagram illustrating a read cache entry 300 for prefetch cache/read data buffer in volatile memory 202 on the persistent memory module 128 shown in FIG. 2. The read cache entry 300 is assigned in volatile memory 202 in response to a read request issued by the CPU module 108 to read 64 bytes of data from the persistent memory 134 on the persistent memory module 128. In response to the read request issued by the CPU module 108, memory module control logic 200 issues a read to read 256-bytes of data that includes the 64-bytes of data requested by the CPU module 108.

Four 64-byte read cache entries 300 are assigned in volatile memory to store the 256-bytes of data. The requested 64-bytes of data are returned to CPU module 108 and are also stored in one of the four assigned read cache entries 300 in volatile memory 202. The read cache entry 300 stores a copy of the 64-byte data stored in persistent memory 134 (cache line) in a 64-byte data block (payload) field 304.

The read cache entry 300 also includes metadata, the metadata includes a tag field 302, and a flag field 306. A tag stored in the tag field 302 includes a portion of the persistent memory address in persistent memory 134 that is associated with the cache line in volatile memory 202. The flag field 306 includes a valid bit ('V') 308, a dirty bit ('D') 310, and a Read/Write flag 312. In an embodiment, the Read/Write flag 312 is cleared (set to logical '0') when the cache line is used in the read cache portion of the cache and set (set to logical '1') when the cache line is used in the write cache portion of the cache. If the dirty bit 310 is set, the data block (payload) field 304 in the read cache entry 300 in volatile memory 202 has been written via the CPU module 108 since the data block (payload) field 304 was read from persistent memory 134. In an embodiment, stale values may be preserved or versioned in the read cache for example, if 256 bytes are read into the read cache, and subsequently 64 bytes of the 256 bytes are written (modified), instead of discarding the 256 bytes in the read cache, the dirty bit may be set for the 64 bytes in the read cache with a different context: in this new context, the dirty bit combined with read flag means this is an older copy of the data.

Figure 3B:
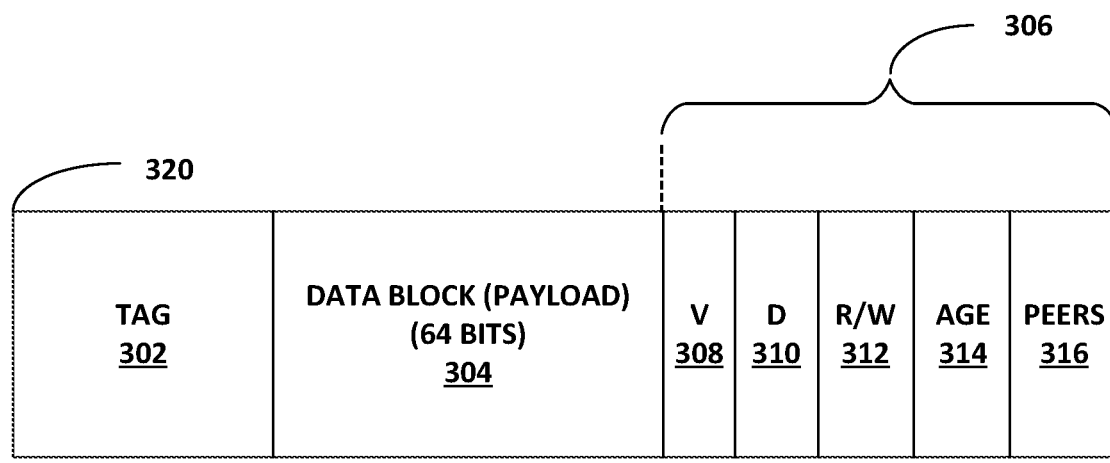
FIG. 3B is a block diagram of a write cache entry in the volatile memory in the persistent memory module shown in FIG. 2.

FIG. 3B is a block diagram of a write cache entry 320 in the volatile memory 202 in the persistent memory module 128 shown in FIG. 2. The write cache entry 320 for write back cache/write data buffer is assigned in volatile memory 202 in response to a write request issued by the CPU module 108 to write 64 bytes of data to the persistent memory 134 on the persistent memory module 128. In response to the write request issued by the CPU module 108, memory module control logic 200 assigns four 64-byte write cache entries 320 in volatile memory 202. The 64-byte data to be written to persistent memory 134 in the persistent memory module 128 is stored in the data block (payload) 304 in one of the assigned 64-byte write cache entries 320.

The write cache entry 320 also includes a tag field 302, and a flag field 306. A tag stored in the tag field 302 includes a portion of the persistent memory address in persistent memory 134 that is associated with the write cache line 320 in volatile memory 202. The flag field 306 includes a valid bit ('V') 308, a dirty bit ('D') 310, and a Read/Write flag 312. If the dirty bit 310 is set, the 64-byte cache line in volatile memory 202 has been written via the CPU module 108 since the write cache line 320 was read from the persistent memory 134. The dirty bit ('D') 310 is set for the portion of the write cache entry 320 that has been written. For example, the portion that has been written may be a 64 byte portion or a 128 byte portion of the 256 bytes in the write cache entry 320.

The flag field 306 for the write cache entry 320 also includes an age field 314 and a peers field 316. The age field 314 stores an indication of the elapsed time (number of DIMM cycles) since the write cache line 320 was assigned in the volatile memory 202 to store data from a last level cache (for example, L2 cache 106 in the SoC 104) or from the volatile memory module 126. The peers field 316 stores the addresses of the peers that correspond to the same persistent memory line in the persistent memory 134 in the persistent memory module 128. For example, if the persistent memory line is 256-bytess, the write cache line is 64-bytes, the peers field can store 1 to 3 peers for the persistent memory line. For example, if the persistent memory line address is 1000 and the line size is 256 bytes, the peers correspond to addresses 1000+64 (bytes), 1000+128, and 1000+192. The data stored in the peer addresses may be kept or discarded depending on the policy that is being used in the read cache and write cache.

Figure 4:
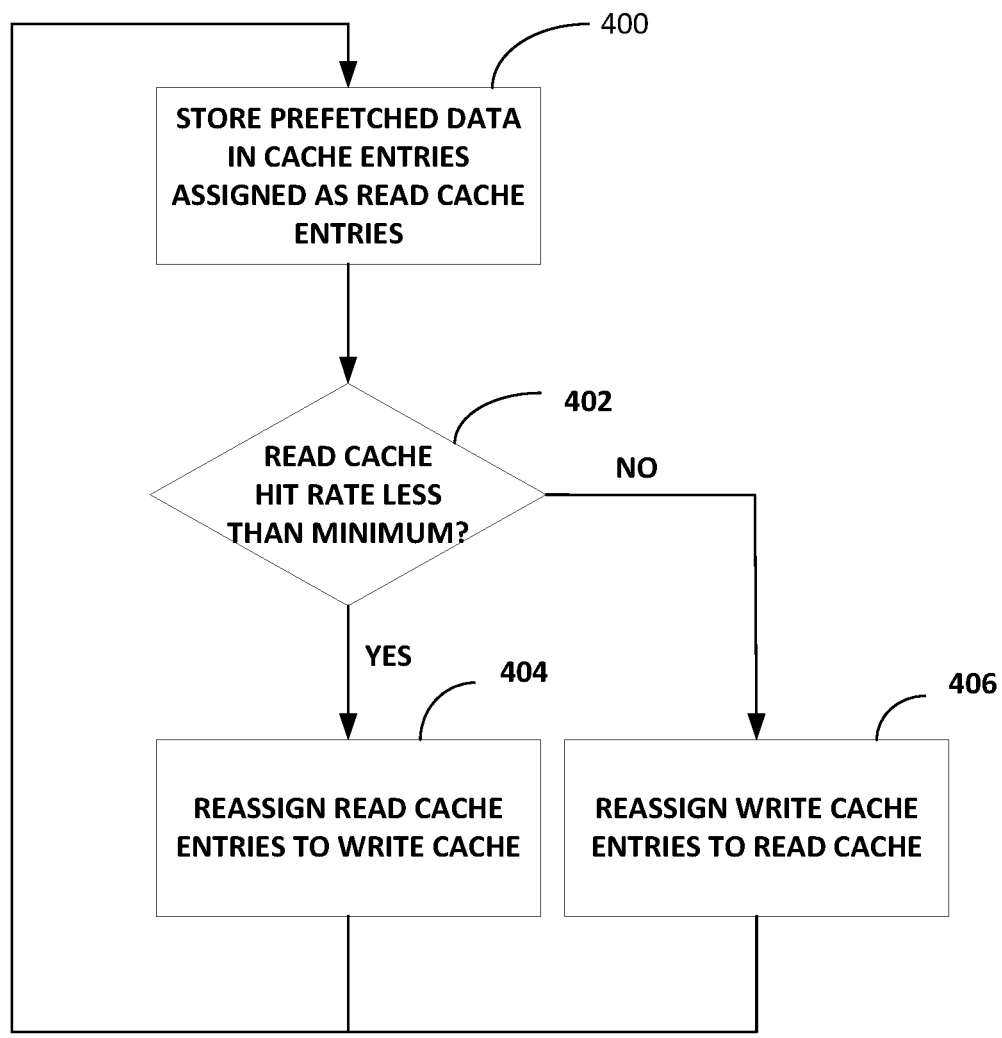
FIG. 4 is a flowgraph of a method performed by the memory module control logic to dynamically manage allocation of the volatile memory as read cache.

FIG. 4 is a flowgraph of a method performed by the memory module control logic to dynamically manage partitioning of the volatile memory 202 as read cache.

At block 400, prefetched data from persistent memory 134 is stored in cache entries assigned to read cache based on the state of the Read/Write flag 312. Processing continues with block 402.

At block 402, a read cache hit occurs when the cache line is a read cache line in the volatile memory (cache) 202. A read cache miss occurs when the cache line is not a read cache line in the volatile memory 202. If the cache hit rate is below a minimum threshold configurable via the mode register 204, a cache line assigned as a read cache line may be reassigned as a write cache line. Processing continues with block 406. If the cache hit rate is not below a minimum threshold, processing continues with block 404.

At block 404, the memory module control logic 200 can reassign a subset of the older cache lines (based on value stored in the age field) currently assigned as read cache lines to write cache lines. The number of cache lines that can be reassigned to write cache lines can increase gradually as the read cache hit rate decreases. Processing continues with block 400 to continue to manage read cache in the volatile memory 202.

At block 406, if the cache hit rate is above a maximum threshold that is configurable via the mode register 204, the cache lines assigned to write cache may be reassigned to read cache. If some of the cache lines assigned to write cache are dirty (that is, the dirty bit 310 in the write cache entry 320 is set to logical '1'), the memory module control logic 200 evicts the cache lines and writes the data stored in the data block (payload) field 304 to persistent memory 134.

When all of the cache lines in volatile memory 202 that are assigned to read cache are used and more cache entries are needed, the memory module control logic 200 may reassign cache entries currently assigned to write cache to read cache, if possible. Processing continues with block 400 to continue to manage read cache in the volatile memory 202.

Figure 5:
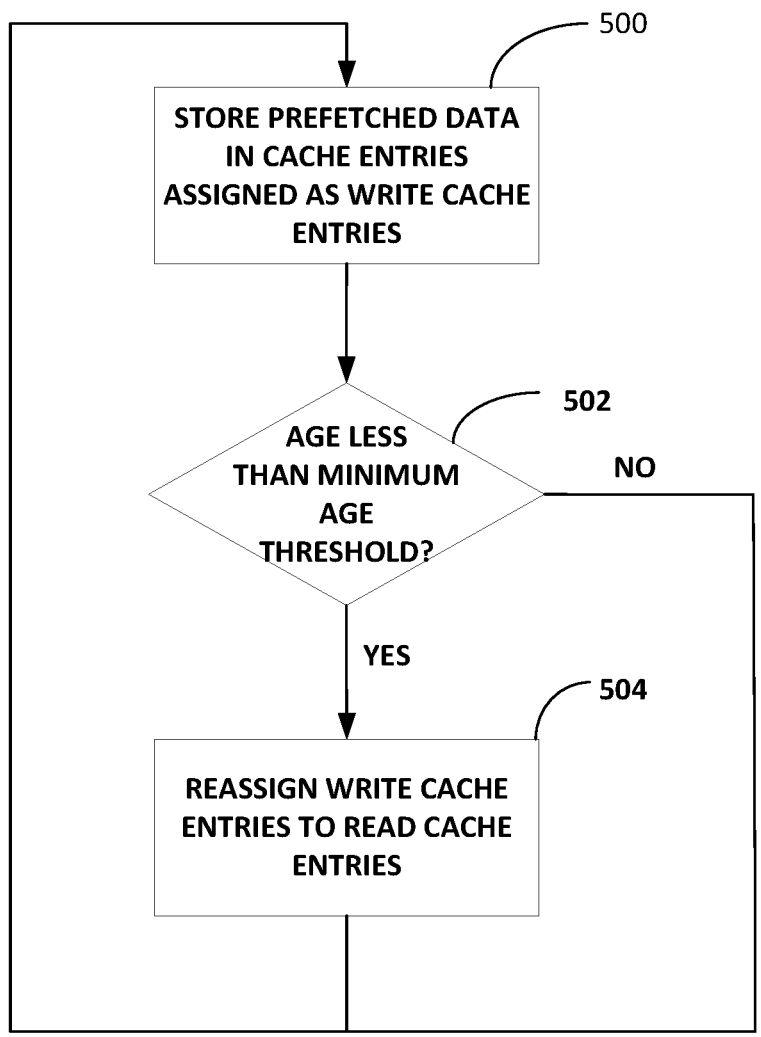
FIG. 5 is a flowgraph of a method performed by the memory module control logic to dynamically manage allocation of the volatile memory as write cache.

FIG. 5 is a flowgraph of a method performed by the memory module control logic to dynamically manage write cache in the volatile memory 202.

At block 500, prefetched lines from persistent memory 134 are stored in cache lines assigned to write cache based on the state of the Read/Write flag 312. A minimum age threshold (MIN_AGE_THRESHOLD) is stored in mode register 204. Processing continues with block 502.

At block 502, cache entries that are currently assigned to the write cache can be reassigned to read cache based on age of the write cache line stored in the age field 314. In an embodiment, cache entries currently assigned to the write cache are reassigned to read cache when the age is greater than the minimum age threshold (MIN_AGE_THRESHOLD) stored in the mode register 204. In an embodiment, the age for the 4 64-byte cache lines allocated for a 256-byte persistent memory line is based on the lowest value stored in the age field of each of the 4 64 byte cache lines. For example, if a 256-byte persistent memory line A is mapped to 64-byte cache lines A1-A3 with 10 cycles stored in the age field in A1 and 30 cycles stored in the age field in A3, the age associated with the 256-byte persistent memory line is 10 (the lowest of the two values). The age is computed with the lines that may be in the read or write caches. For example, A1 and A2 may be in the write cache because they are being written to and A3 and A4 may be in the write cache because they are being read by multiple processors. Processing continues with block 504.

At block 504, if the value in the age field for each cache line assigned to write cache is less than the minimum age threshold, the memory module control logic 200 can reassign a subset of the cache lines 206 currently assigned to read cache to write cache. Processing continues with block 500 to continue to dynamically manage write cache in the volatile memory 202.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A memory module comprising:
   a persistent memory to store data;
   a cache; and
   control logic coupled to the persistent memory and the cache, the control logic to monitor write and read accesses to/from the persistent memory and to dynamically partition the cache to assign a first portion of the cache for read cache and a second portion of the cache for write cache based on monitored read and write accesses to prioritize read and write operations to the persistent memory, the control logic to monitor a hit rate in the first portion of the cache and to reduce a size of the first portion of the cache and to increase a size of the second portion of the cache if the hit rate is below a minimum threshold.

2. The memory module of claim 1, wherein the control logic to monitor an age of write cache lines in the second portion of the cache and to increase the size of the second portion of the cache and decrease the size of the first portion of the cache if the age of the write cache lines is below a minimum threshold.

3. The memory module of claim 1, wherein N-bytes of data are transferred to/from the memory module per transfer and M times N-bits of data are transferred between persistent memory and cache per intra-memory module transfer.

4. The memory module of claim 3, wherein N is 64 and M is 4.

5. The memory module of claim 1, wherein the memory module is a dual-in-line memory module.

6. A method comprising:
   monitoring write accesses to a persistent memory in a memory module;
   monitoring read accesses from the persistent memory;
   prioritizing read and write operations to the persistent memory by dynamically partitioning a cache in the memory module to assign a first portion of the cache for read cache and a second portion of the cache for write cache based on monitored read and write accesses to the persistent memory;
   monitoring a hit rate in the first portion of the cache; and
   reducing a size of the first portion of the cache and increasing a size of the second portion of the cache if the hit rate in the first portion of the cache is below a minimum threshold.

7. The method of claim 6, further comprising:
   monitoring an age of cache lines in the second portion of the cache; and
   increasing the size of the second portion of the cache and decreasing the size of the first portion of the cache if the age of the cache lines is below a minimum threshold.

8. The method of claim 6, wherein N-bytes of data are transferred to/from the memory module per transfer and M*N-bits of data are transferred between persistent memory and cache per intra-memory module transfer.

9. The method of claim 8, wherein N is 64 and M is 4.

10. The method of claim 6, wherein the memory module is a dual-in-line memory module.

11. A system comprising:
a memory module comprising:
a persistent memory to store data;
a cache; and
control logic coupled to the persistent memory and the cache, the control logic to monitor write and read accesses to/from the persistent memory and to dynamically partition the cache to assign a first portion of cache for read cache and a second portion of the cache for write cache based on monitored read and write accesses to prioritize read and write operations to the persistent memory; and
a memory controller communicatively coupled to the memory module to generate a request for a write access or a read access to/from the memory module, the control logic to monitor a hit rate in read cache lines in the first portion of the cache and to reduce a size of the first portion of the cache and to increase a size of the second portion of the cache if the hit rate is below a minimum threshold.

12. The system of claim 11, wherein the control logic to monitor an age of write cache lines in the second portion of the cache and to increase the size of the second portion of the cache assigned for write cache and decrease the size of the first portion of the cache assigned to read cache if the age of the write cache lines is below a minimum threshold.

13. The system of claim 11, wherein N-bytes of data are transferred to/from the memory module per transfer and M times N-bits of data are transferred between persistent memory and cache per intra-memory module transfer.

14. The system of claim 13, wherein N is 64 and M is 4.

15. The system of claim 11, wherein the memory module is a dual-in-line memory module.

* * * * *